United States Patent
Aines et al.

(10) Patent No.: US 8,808,433 B2
(45) Date of Patent: *Aug. 19, 2014

(54) CARBON ION PUMP FOR REMOVAL OF CARBON DIOXIDE FROM COMBUSTION GAS AND OTHER GAS MIXTURES

(75) Inventors: Roger D. Aines, Livermore, CA (US); William L. Bourcier, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/896,621

(22) Filed: Oct. 1, 2010

(65) Prior Publication Data

US 2011/0020208 A1 Jan. 27, 2011

Related U.S. Application Data (62) Division of application No. 11/657,682, filed on Jan. 23, 2007, now Pat. No. 7,828,883.

(60) Provisional application No. 60/761,564, filed on Jan. 23, 2006.

(51) Int. Cl.
*B03C 3/00* (2006.01)

(52) U.S. Cl.
USPC .............. 96/52; 95/71; 95/81; 95/236; 96/54; 96/235; 204/554

(58) Field of Classification Search
None
See application file for complete search history.

(56) References Cited

U.S. PATENT DOCUMENTS

| | | | |
|---|---|---|---|
| 3,846,274 A * | 11/1974 | Gifford | 204/645 |
| 4,148,684 A | 4/1979 | Farin | |
| 6,218,174 B1 | 4/2001 | Keyser | |
| 6,309,532 B1 * | 10/2001 | Tran et al. | 205/687 |
| 6,485,697 B1 | 11/2002 | Chao | |
| 7,628,847 B2 * | 12/2009 | Pope et al. | 96/242 |
| 2004/0253159 A1 * | 12/2004 | Hakka et al. | 423/228 |
| 2008/0317651 A1 * | 12/2008 | Hooper et al. | 423/230 |

FOREIGN PATENT DOCUMENTS

| | | |
|---|---|---|
| JP | 07-213861 | 8/1995 |
| WO | WO 2006/082436 A | 8/2006 |

OTHER PUBLICATIONS

Database WPI Week 20044. Derwent Publications Ltd., London, GB; AN 2004-464451 XP002445588 & JP 2004 174369 A (Meidensha Corp.) Jun. 24, 2004 abstract.
Office Action issued by Canadian IP Office, dated Jan. 14, 2013 for Application No. 2,639,953, filed Jan. 23, 2007 (i.e., PCT filing Date).
Office Action issued by Canadian IP Office, dated Nov. 13, 2013 for Application No. 2,639,953, filed, Jan. 23, 2007 (i.e., PCT filing Date).

* cited by examiner

*Primary Examiner* — Duane Smith
*Assistant Examiner* — Phillip Shao
(74) *Attorney, Agent, or Firm* — Eddie E. Scott (57) ABSTRACT

A novel method and system of separating carbon dioxide from flue gas is introduced. Instead of relying on large temperature or pressure changes to remove carbon dioxide from a solvent used to absorb it from flue gas, the ion pump method, as disclosed herein, dramatically increases the concentration of dissolved carbonate ion in solution. This increases the overlying vapor pressure of carbon dioxide gas, permitting carbon dioxide to be removed from the downstream side of the ion pump as a pure gas. The ion pumping may be obtained from reverse osmosis, electrodialysis, thermal desalination methods, or an ion pump system having an oscillating flow in synchronization with an induced electric field.

5 Claims, 5 Drawing Sheets

CARBON ION PUMP FOR REMOVAL OF CARBON DIOXIDE FROM COMBUSTION GAS AND OTHER GAS MIXTURES

CROSS-REFERENCE TO RELATED APPLICATIONS

This application is a Divisional of application Ser. No. 11/657,682 filed Jan. 23, 2007, now U.S. Pat. No. 7,828,883 entitled "Carbon Ion Pump for Removal of Carbon Dioxide from Combustion Gas and Other Gas Mixtures". This application claims the benefit of U.S. Provisional Patent Application No. 60/761,564, filed Jan. 23, 2006, and titled "Carbon Ion Pump for Removal of Carbon Dioxide from Combustion Gas and Other Gas Mixtures", which are incorporated herein by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND OF THE INVENTION

1. Field of the Invention

The present invention relates to a separation method and apparatus/system for cleaning of combustion gas followed by the capture and sequestering of carbon dioxide, and more particularly, the present invention relates to a water based separation method and apparatus/system for capturing and sequestering carbon dioxide from combustion gas and other mixtures.

2. Description of Related Art

A major limitation to reducing greenhouse gases in the atmosphere is the expense of stripping carbon dioxide from other combustion gases. Without a cost-effective means of accomplishing this, the world's hydrocarbon resources, if used, will continue to contribute carbon dioxide to the atmosphere.

A few major power plants around the world currently remove carbon dioxide from flue gas, for sale as an industrial product. Oil companies commonly remove carbon dioxide from natural gas to improve its energy content. In both cases the most common technology is temperature-swing absorption (TSA) using a methylated ethyl amine solvent (MEA).

The MEA process relies on the strongly selective bonding of carbon dioxide to the solvent for selective removal from the flue gas, but requires considerable heating to increase the gas pressure in the removal step to an acceptable level. In particular, the flue gas contacts the MEA dissolved in water in a packed column, and then the carbonated solution is heated to 120° C. to extract a nearly pure carbon dioxide gas. Sulfur and nitrous oxide are removed ahead of this step because they bind so tightly to the solvent that they cannot be removed. An alternative MEA cycle using pressure cycling can be used in some cases, when the inlet gas to be separated is at high pressure and the carbon dioxide can be removed from the solvent by lowering the ambient pressure. In both this process and the temperature swing process, the carbon dioxide fugacity is changed by changing the physical conditions of the solvent. This is inefficient due to the energy unrecoverably lost doing work on a large volume of solvent, in addition to the mechanically complex system and the need for frequent solvent addition due to degradation. It is a fundamentally complex and chemically-intensive process only suitable for large-scale industrial separation today and it is too expensive to contribute a globally-large removal of carbon from combustion sources.

The Greenhouse Gas Program of the International Energy Agency (Davison et al. 2001) has studied the application of this technology to electric power plants. They estimate an energy cost of approximately 35% of the power generated by a pulverized coal power plant is required for this type of carbon dioxide removal. Many variants are under study, which permit slightly higher efficiency or longer solvent life, including solid sorbents; thus far, dramatic improvements have not been seen.

Accordingly, a need exists for an improved process and system to control the removal of $CO_2$ in an economical and environmentally safe way. The present invention is directed to such a need.

SUMMARY OF THE INVENTION

The present invention is directed to a Carbon ion pumping process for extracting and sequestering $CO_2$ that includes: dissolving a predetermined gas into a water wash, wherein the water wash includes a degree of alkalinity; passing the water having the dissolved gas into a means configured to produce a predetermined ionic concentrate; and harvesting a resultant $CO_2$.

Another aspect of the present invention is directed to a Carbon ion pumping process for extracting and sequestering $CO_2$ that includes: dissolving a predetermined gas into water, wherein the water comprises a degree of alkalinity; directing the water through a first channel and a second channel; oscillating a fluid flow therethrough a plurality of flow channels so as to fluidly communicate the first channel with the second channel; applying a periodic electric field about each of the plurality of flow channels in synchronization with the oscillating fluid flow so as to enable a directed movement of predetermined ions from the first channel to the second channel so as to produce an ionic concentrate in the second channel; and extracting and sequestering Carbon Dioxide ($CO_2$) from the second channel.

Another aspect of the present invention is directed to a system for removing and sequestering a predetermined amount of Carbon Dioxide ($CO_2$) from a gas that includes: a distribution means for introducing a predetermined gas; a water wash configured to produce an ionic solution, wherein the water wash is operably coupled to the distribution means; and a means operably coupled to the water wash and configured to produce an ionic concentrate in the ionic solution, wherein the carbon dioxide can be extracted and sequestered as a pure gas by increasing the overlying vapor pressure within the ionic solution.

A final aspect of the present invention is directed to a system for removing and sequestering a predetermined amount of Carbon Dioxide ($CO_2$) from a gas that includes: a distribution means for introducing a predetermined gas; a water wash having a degree of salinity so as to produce an ionic solution, wherein the water wash is operably coupled to the distribution means; a feed flow channel operably coupled to the water wash; a concentrate flow channel also operably coupled to the water wash; a plurality of flow channels configured to fluidly communicate an oscillating flow between the feed flow channel and the concentrate flow channel; and one or more pairs of conductive plates adapted about the plurality of flow channels, wherein an applied periodic electric field to the one or more pairs of conductive plates in synchronization with the oscillating flow facilitates a directed movement of predetermined ions therethrough said flow channels from the feed flow channel to the concentrate flow channel; and wherein a resultant overlying vapor pressure produced in the ionic concentrate enables the carbon dioxide to be extracted and sequestered as a pure gas.

Accordingly, the present system and method approach to increasing the concentration of the extracted gas permits new approaches to treating flue gas and other gas mixtures of inert gas like nitrogen, with acid gases like carbon dioxide or sulfur dioxide, since the slightly basic water used as the extraction medium is impervious to trace acid gases that destroy existing solvents, and no pre-separation is necessary. The process may be operated in such a way to produce clean water (similar to reverse osmosis water) as an additional product.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 5b shows the movement of cations and anions with the e-field on.

DETAILED DESCRIPTION OF THE INVENTION

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

Moreover, in the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

Finally, various terms used herein are described to facilitate an understanding of the invention. It is understood that a corresponding description of these various terms applies to corresponding linguistic or grammatical variations or forms of these various terms. It will also be understood that the invention is not limited to the terminology used herein, or the descriptions thereof, for the description of particular embodiments.

General Description

Carbon dioxide makes up from 5% (modern gas-fired plants) to 19% (modern coal plants) of the flue gas from a power plant. The remainder is mostly nitrogen, unused oxygen, and oxides of nitrogen and sulfur (which are strong greenhouse gases in addition to contributing to poor quality).

As disclosed herein, use of a liquid absorber to separate gases depends on both selective absorption of the desired gas, and changing the vapor pressure (properly the fugacity) of the gas over the solvent. Carbon dioxide makes up from 5% (modern gas-fired plants) to 19% (modern coal plants) of the flue gas from a power plant. The remainder is mainly nitrogen, unused oxygen, and oxides of nitrogen and sulfur (which are strong greenhouse gases in addition to contributing to poor air quality). Carbon dioxide, in particular, is soluble in water, in which it spontaneously interconverts between $CO_2$ and $H_2CO_3$ (carbonic acid). The relative concentrations of $CO_2$, $H_2CO_3$, and the deprotonated forms $HCO_3^-$ (bicarbonate) and $CO_3^{2-}$ (carbonate) depend on pH. In neutral or slightly alkaline water (pH of greater than 6.0), the bicarbonate form predominates (>50%) becoming the most prevalent (>95%) at the pH of seawater.

The present invention thus provides for a water based method and system for separating carbon dioxide from flue gas and other combustion gases based on ionic pumping of carbonate ions dissolved in the fluid. Instead of relying on large temperature or pressure changes to remove carbon dioxide from solvent used to absorb it from, for example flue gas (e.g., $CO_2$, $H_2O$, $N_2$, $SO_x$, $NO_x$), the ion pumping methods and systems when configured to receive the dissolved carbonate ions, dramatically increases the concentration of such ions in solution.

The ion pumps, as disclosed herein, can be configured from known systems understood by those of ordinary skill in the art, such as, but not limited to, membrane process (e.g., electro dialysis and reverse osmosis pumps), or any of the available thermal processes (e.g., Multiple-effect evaporation/distillation (MED), Multi-stage flash evaporation/distillation (MSF), Vapor compression distillation (LTV), and Solar distillation).

A preferred ion pump configuration, as discussed herein, includes related architecture disclosed in Incorporated by reference Co-pending, Co-filed U.S. application Ser. No. 13/159,862, filed Jun. 14, 2011 titled "Deionization and Desalination Using Electrostatic Ion Pumping" by Bourcier et al., the disclosure of which is herein incorporated by reference in its entirety. In such a structure, as discussed in the Co-pending and Co-filed application, externally applied electrostatic fields in conjunction with an oscillating fluid flow immobilize and separate the Carbonate ions from the received fluids. The desired ions are held in place during fluid movement in one direction, and released for transport during fluid movement in the opposite direction. The targeted ions are "ratcheted" across the charged surface from the feed side to the concentrate side. Such a method and system is very simple and involves only pumps, charged surfaces, and manifolds for fluid collection. It is therefore operator friendly, and amenable to remote operation.

The charged ion collection surfaces are often in a substantially parallel configuration or even in a spiral-wound configuration all of which are designed to facilitate both cleaning and swapping of replacements for damaged modules. The surfaces themselves can be metalized electrodes or thin sheets of carbon aerogel composites, or nano-engineered conductive surfaces of various geometries and surface areas, such as, but not limited to, ion-track-etched polycarbonates with metalized surfaces to enable desired sorptive surface morphology and pore structures. As another beneficial electrode structure, beds of carbon aerogel particles can alternatively be used to form electrodes because such beds of carbon aerogel particles have much higher specific area and sorption capacity than beds of conventional carbon powder, and therefore are superior electrodes for deionization purposes.

Whichever ion pump system and method that is chosen to receive the dissolved carbonate ions, it is to be appreciated that such ion pump configurations nonetheless increase the overlying vapor pressure of carbon dioxide gas, which can then be removed by the novel system of the present invention from the downstream side of the ion pump as a pure gas. Such novel embodiments of the present invention to increasing the concentration of the extracted gas permits new approaches to treating flue gas, since the slightly basic water used as the extraction medium is impervious to trace acid gases that destroy existing solvents, and no pre-separation is necessary.

Specific Description

Figure 1:
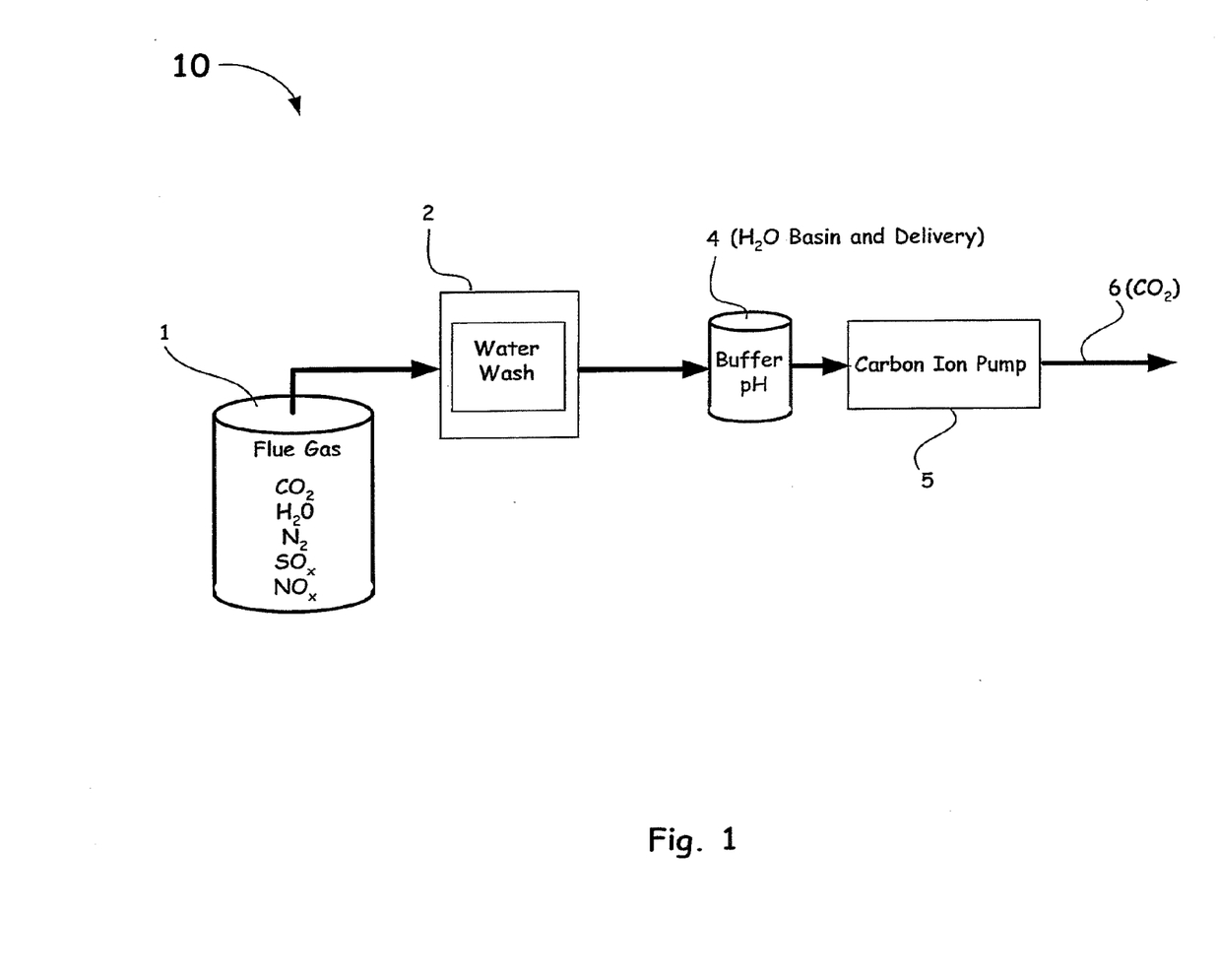
FIG. 1 is a general illustration of the Carbon ion pump apparatus of the present invention.

FIG. 1 shows a general layout of the Carbon ion pumping embodiment of the present invention, and is generally designated as reference numeral 10. As shown in FIG. 1, Carbon ion pumping system/apparatus 10 can include, a source of flue gas (e.g., $CO_2$, $H_2O$, $N_2$, $SO_x$, $NO_x$) and/or other gas mixtures 1, a water wash 2, a water basin and delivery system 4 having an introduced buffer pH (e.g., phosphate), and a Carbon ion pump 5. The system/process 10 is thus designed to dissolve flue gas (e.g., $CO_2$, $H_2O$, $N_2$, $SO_x$, $NO_x$) and/or other gas mixtures first in slightly alkaline water as introduced by the water wash 2 prior to producing a concentrate from which a harvested $CO_2$ can be produced.

Table 1 below shows the dissolution of common flue and combustion gases in addition to concentration factors of the present invention.

Returning to FIG. 1, the water wash 2 system itself can be incorporated from known systems utilized by those of ordinary skill in the art. As an illustration only, the common system can include a plurality of spray levels to inject the liquid so as to contact the flue gas, which is designed to flow through such a water wash 2 system at a predetermined constant velocity. The number of spray levels can be varied depending on the effective liquid to gas (L/G) ratios. In addition, spray nozzles of different sizes producing different flow rates, spray patterns, and droplet sizes can also be utilized. The water having the flue gas then passes from water wash 2 to water basin 4 having an introduced buffer pH (e.g., phosphate) to increase $CO_2$ carrying capacity upon recycling.

Water basin 4 is also coupled to operating pumps and/or operating valves (not shown) known and understood by those of ordinary skill in the art to receive recycled fluids (not shown) from ion pump 5 in addition to directing flow to ion pump 5, so as enable the harvesting of a desired gas, such as $CO_2$ 6, as shown in FIG. 1.

Upon receiving the dissolved ions in a fluid having a pH of greater than about 6.5 so as to increase $CO_2$ carrying capacity, the ion pump 5 can produce a concentrate from which carbon dioxide 6 is released. The concentrate (not shown) is recombined with a dilute stream (not shown) from the ion pump 5 and re-cycled to the water wash 4. In addition, nitrate and sulfate are also concentrated with the bicarbonate and removed separately as solids (they are more stable in solution than the carbonate).

Figure 2:
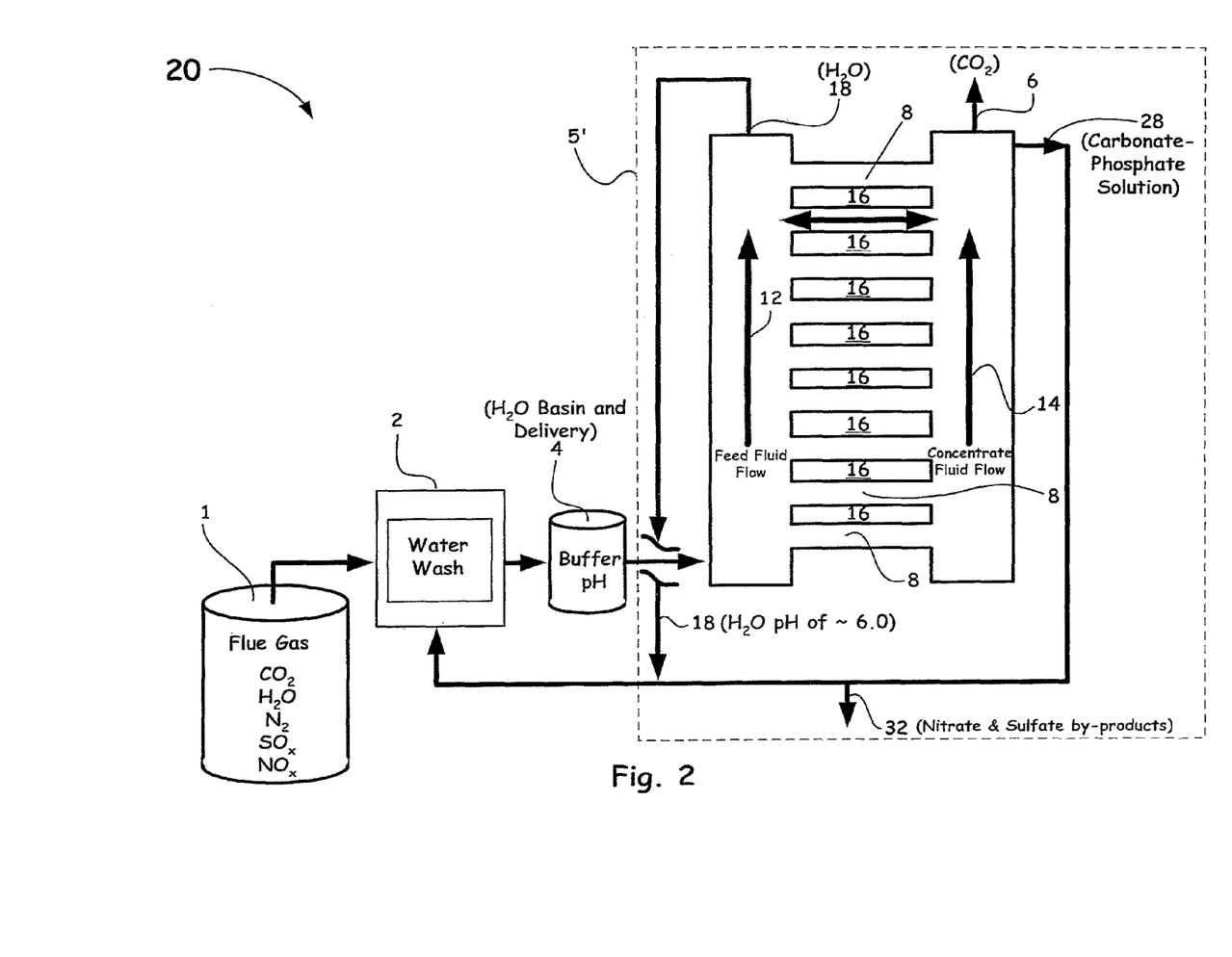
FIG. 2 is a general illustration of the preferred Carbon ion pump apparatus of the present invention.

FIG. 2 shows a preferred Carbon ion pumping embodiment of the present invention, and is generally designated as reference numeral 20, wherein like reference numerals are used when common to the system 10, as shown in FIG. 1. As shown in FIG. 2, Carbon ion pumping system/apparatus 20, similar to system 10 as shown in FIG. 1, can include a source of flue gas (e.g., $CO_2$, $H_2O$, $N_2$, $SO_x$, $NO_x$) and/or other gas mixtures 1, a water wash 2, a water basin and delivery system 4 having an introduced buffer pH (e.g., phosphate to increase $CO_2$ carrying capacity) and a Carbon ion pump designated as reference numeral 5' (also shown within the dashed box). As discussed above, ion pump 5' and related architecture is discussed in Incorporated by reference Co-pending, Co-filed U.S. application Ser. No. 11/655,423, titled "Deionization and Desalination Using Electrostatic Ion Pumping" by Bourcier et al.

As described above, upon receiving the dissolved ions in a fluid having a pH of greater than about 6.5 (such a pH increases $CO_2$ carrying capacity) the ion pump 5', as shown in FIG. 2, can produce a concentrate 28 from which carbon dioxide 6 is released. Concentrate 28 (as shown by an accompanying directional arrow) is recombined with a dilute stream 18 (also shown by an accompanying directional arrow) often having a resultant pH of about 6.0, from the ion pump 5 and re-cycled to the water wash 4. In addition, nitrate and sulfate 32 are also concentrated with the bicarbonate concentrate 28

TABLE 1

How acid flue gas components readily dissolve and ionize in buffered water.

| Coal Flue Gas Proportion | | Dissolved Concentration | Concentration Factor |
|---|---|---|---|
| 13.9% | $CO_2 + H_2O \Rightarrow H^+ + HCO_3^-$ | 1200 ppm | (300X relative to Nitrogen) |
| 0.07% | $SO_x + H_2O \Rightarrow H^+ + HSO_4^-$ | (all of it) | (Substantially Large) |
| 0.02% | $NO_x + \sim H_2O \Rightarrow H^+ + HNO_3^-$ | (all of it) | (Substantially Large) |
| 73.8% | $N_2 + H_2O \Rightarrow N_2 + H_2O$ | 13 ppm | |
| 3.0% | $O_2 + H_2O \Rightarrow O_2 + H_2O$ | 3 ppm | | and either removed separately as solids or evolved in gas form (they are more stable in solution than the carbonate) by methods known and understood by those of ordinary skill in the art.

With respect to the ion pump 5', such an apparatus is designed with a feed fluid flow channel 12 (fluid flow shown as a one-way directional arrow) and a concentrate fluid flow channel 14 (fluid flow also shown as a one-way directional arrow), that fluidly communicate with a plurality of disposed fluid flow channels 8 (three are referenced for simplicity), and a plurality of spaced-apart, often equidistantly spaced apart, engineered corrosion resistant charge collection surfaces 16, such as but not limited to metalized electrodes, ion track etched polycarbonates with metalized surfaces, and/or carbon aerogel electrodes.

In the method of operation, a slightly alkaline fluid having a pH of greater than about 6.5 and having desired dissolved ions that originate from a source, such as, but not limited to, (e.g., $CO_2$, $H_2O$, $N_2$, $SO_x$, $NO_x$) and/or other gas mixtures can be received by feed fluid flow channel 12 and concentrate fluid flow channel 14 and can be directed back and forth in an oscillating manner between the plurality of flow channels 8, e.g., as illustrated by the double directional arrow in FIG. 1.

An applied e-field is synchronized with an oscillation fluid pumping frequency by applying the electric field at predetermined times to the designed flow speeds in the feed fluid flow channel 12 and concentrate fluid flow channel 14 in a predetermined manner using, for example, a computer 7. As an illustration, the fluid flow rates can be manipulated by a computer (not shown) controlled fluid circuit (e.g., feed pumps and concentrate pump, and/or operating valves, operably coupled to basin and delivery system 4) in synchronization with applied e-fields directed by the same computer through a coupled electrical circuit (not shown). See a similar discussion of this operation in Incorporated by reference Co-pending, Co-filed U.S. application Ser. No. 13/159,862, filed Jun. 14, 2011 titled "Deionization and Desalination Using Electrostatic Ion Pumping" by Bourcier et al. Such controls can be made via the computer either via operator control or automatically using custom and/or commercial software (e.g., via a graphical computer interface software program, such as, for example, LabVIEW).

The flow channels 8 themselves are arranged to have widths between about 0.1 mm and up to about 2 mm, often up to about 0.5 mm and lengths between about 0.1 mm and up to about 10 cm in a configured manner that is based upon the positioning of the separated charge collection surfaces 16 operating as conductors, such that when a voltage between about 0.1 volts and up to about 10 volts is applied to the charge collection surfaces 16, predetermined ions, such as disassociated ions from flue gas, are attracted and electrosorb to their surfaces; cations to negatively charged collection surfaces, and anions to positively charged collection surfaces.

The ion content, e.g., the $HCO_3^-$ concentration, of the moving fluid is reduced by the amount of sorbed ions removed from bulk solution (i.e., from feed fluid flow channel 12). The ions do not flow with the fluid; they remain attached to the electrode surface in the electrostatic double layer. If the fluid now flows in the reverse direction, and simultaneously the voltage is removed, the ions return to solution and are transported with the solution. As the solution moves back and forth between the charge collection surfaces 16 via the plurality of flow channels 8, the desired ions will be "ratcheted" across the plate surfaces so as to be directed along a concentrate flow channel line. The ion pump effectively increases the concentration of the bicarbonate (red line) with a corresponding increase in carbon dioxide pressure. The carbon dioxide 6 is released at a pressure of about one bar. The ion pump increases the $HCO_3^-$ concentration; for flue gas from a coal-fired power plant, an increase of 30 will release about 6.5 grams of pure carbon dioxide per liter of fluid.

Specifically, if feed source fluid is received from basin and delivery system 4 within feed fluid flow channel 12 is provided on one side of the charge collection surfaces 16, substantially perpendicular to such surfaces (as shown in FIG. 2), the ions, e.g., $HCO_3^-$, by passing it by a series, i.e., a plurality of substantially parallel charge collection surfaces 16 and the water 18 cleaned by such a method can also be harvested via a feed fluid output channel (shown at the top of feed flow channel 12).

The ions, such as $HCO_3^-$, passes along the charge collection surfaces 16 and is accumulated in the concentrate fluid flow channel 14 collecting on the side opposite to the feed fluid flow channel 12. The concentrate that does not come off as carbon dioxide 6 is thus recycled via a waste output channel 28 (denoted as a carbonate phosphate solution) and combined with the cleaned water 18 output and further directed to water basin and delivery system 4. The greater the number of charge collection surfaces 16, and thus the greater the number of flow channels 8, the greater the amount of ions, such as $HCO_3^-$, that is removed. The greater the number of ions attached to the charge collection surfaces 16, the fewer the number of charge collection surfaces 16 and the fewer the number of flow channels 8 are needed for a desired amount of ion removal. It is to be appreciated that such a parallel flow arrangement, as shown in FIG. 1, enables the system/apparatus to perform in the event that any or a number of the flow channels 8/charge collection surfaces 16 become inoperable for any particular reason, e.g., by fouling, electrical non-communication, plugging, etc.

Figure 3:
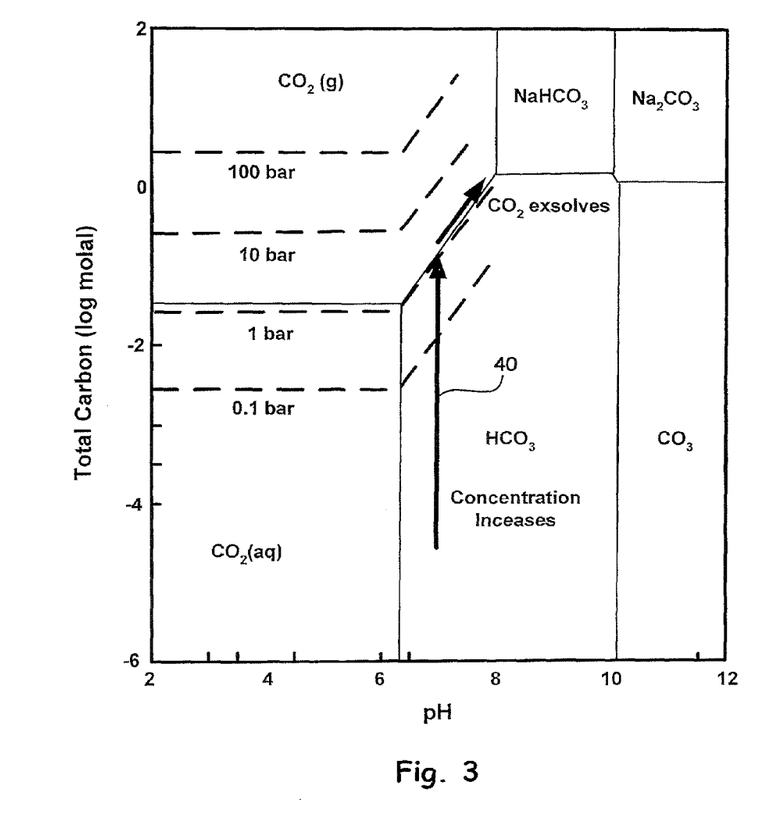
FIG. 3 shows a model indicating the effects of the ion pumping process for a simple sodium bicarbonate-phosphate water system of the present invention.

FIG. 3 shows a model indicating the effects of the ion pumping process, as disclosed herein, for a simple sodium bicarbonate-phosphate water system. The ion pump effectively increases the concentration of bicarbonate (shown as reference numeral 40 attached to a directional arrow) with a corresponding increase in carbon dioxide pressure. Carbon dioxide is thus released at a pressure of about one bar. The ion pump increases the $HCO_3$-concentration. For flue gas from a coal-fired power plant, an increase of 30 releases about 6.5 grams of pure carbon dioxide per liter of fluid.

Figure 4A:
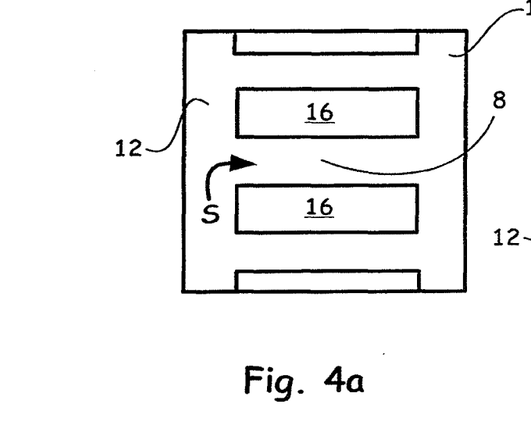
FIG. 4a illustrates the oscillatory back and forth fluid movement and the ratcheting of ions across flow channels.
Figure 4B:
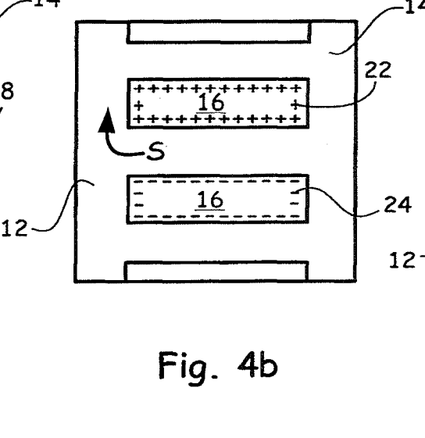
FIG. 4b illustrates the oscillatory back and forth fluid movement and the ratcheting of ions across flow channels.
Figure 4C:
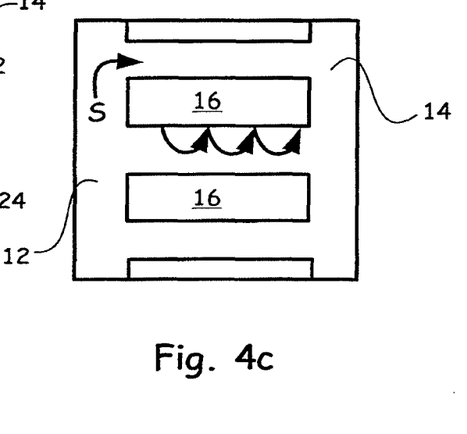
FIG. 4c illustrates the oscillatory back and forth fluid movement and the ratcheting of ions across flow channels.

FIGS. 4*a-c* shows schematically what happens to an individual packet of electrolyte solution (denoted by the letter S) as it travels up the feed fluid flow channel 12, as similarly shown in FIG. 2.

In particular, FIG. 4*a* illustrates how the oscillatory pumping back and forth of the present invention at frequencies of greater than about 0.5 Hz between the charge collection surfaces 16 causes the solution S packet to enter the space (i.e., flow channel 8) between the surfaces 16.

In FIG. 4*b*, a field is applied by having predetermined charge collection surfaces 16 enabled with a positive 22 and a negative voltage 24 coupled thereto in timing with the oscillating flow rate of the channels 12 and 14. (It is to be appreciated that while FIG. 2*b* illustrates a single charge collection surface having a positive charge, it is to be noted that each charge collection surface 16 can also be arranged to have opposite charges applied to a respective opposite face).

In the arrangement of FIG. 4*b*, ions, such as $HCO_3^-$, are sorbed to the particular electrode charge collection surface(s) 16 because of the applied field. When the packet S moves back out (i.e., back into feed fluid channel 12) between the charge collection surface(s) 16 because of the oscillating flow rate within channels 12 and 14, it has lost some of its ions, which remains on the surface of a respective charged collection surface(s) 16.

FIG. 4c illustrates how subsequent cycles force $HCO_3^-$ to the right (denoted by the black curved arrows) and into concentrate fluid flow channel 14. For a particular cycle, the applied field that had been induced, as shown in FIG. 4b, is removed, and flow rate is increased in a timed manner in feed fluid flow channel 12 to coincide with the removal of the applied field, and ions once immobilized by the applied field are thus fluidly moved in a direction towards the concentrated fluid flow channel 14. Additional cycles ratchets trapped ions further toward the direction of concentrate fluid flow channel 14. De-concentrated S fluid packet then moves up and the cycle is repeated with each charge collection surface(s) 16 stage.

Figure 5A:
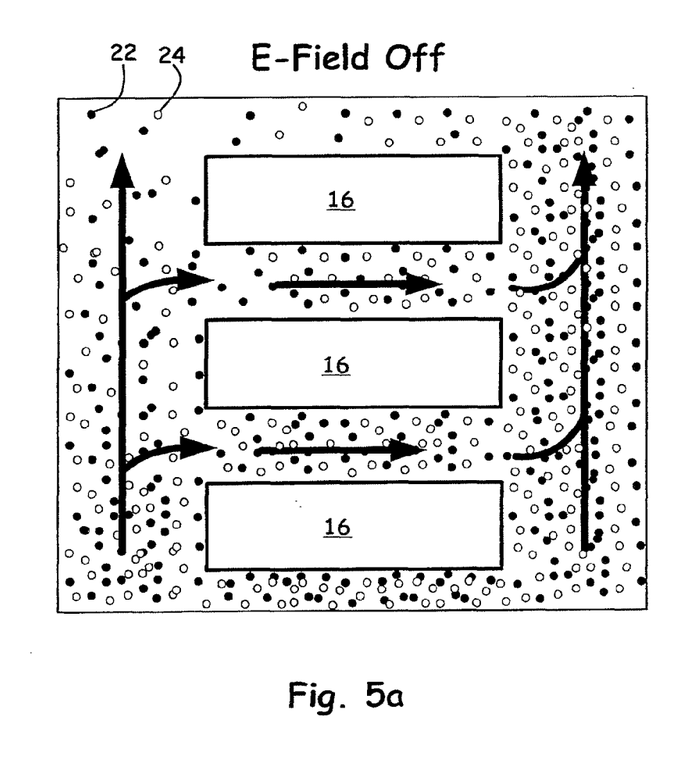
FIG. 5a shows the movement of cations and anions with the e-field off.
Figure 5B:
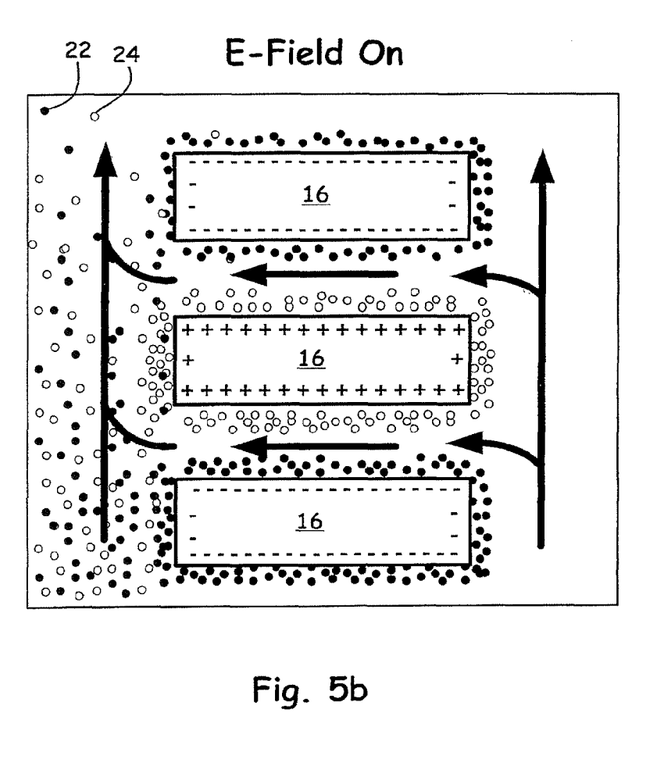

FIGS. 5a-b further illustrates the movement of a plurality of cations 22 and anions 24 during the same process. Electrostatic charge (denoted by + and − in FIG. 5b) on electrodes 16 holds cations 22 (denoted by the darkened circles) and anions 24 (denoted by the white circles) in place during fluid movement to the left when an e-field is applied, but releases them for fluid movement to the right when the e-field is removed, as shown in FIG. 5a. Plate spacing (widths between about 0.1 mm and up to about 2 mm, often up to about 0.5 mm and lengths between about 0.1 mm and up to about 10 cm) is optimized to balance desirable short path length for ion separation, with wide spacing for fluid flow.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system for removing and sequestering carbon dioxide from a flue gas source, the flue gas containing the carbon dioxide, comprising:

distribution means for channeling the flue gas from the flue gas source;

a water wash having a degree of salinity so as to produce an ionic solution including ions, said water wash operably coupled to said distribution means for channeling the flue gas from the flue gas source;

a feed flow channel operably coupled to said water wash;

a buffer;

a system operably coupled to said feed flow channel for introducing said buffer to said ionic solution;

a concentrate flow channel operably coupled to said water wash and said system for introducing a buffer to said ionic solution;

a plurality of flow channels configured to fluidly communicate an oscillating flow between said feed flow channel and said concentrate flow channel;

one or more pairs of conductive plates adapted about said plurality of flow channels, an applied periodic electric field adapted to be applied to said one or more pairs of conductive plates in synchronization with said oscillating flow, wherein said applied periodic electric field facilitates a directed movement of said ions therethrough said flow channels from said feed flow channel to said concentrate flow channel creating an ionic concentrate; and means for producing an overlying vapor pressure within said ionic concentrate that enables the carbon dioxide to be extracted from the flue gas and sequestered as a pure gas.

2. The system of claim 1, wherein said means for producing an overlying vapor pressure within said ionic concentrate that enables the carbon dioxide to be extracted from the flue gas and sequestered as a pure gas comprises an ion pump.

3. The system of claim 1, wherein said means for producing an overlying vapor pressure within said ionic concentrate that enables the carbon dioxide to be extracted from the flue gas and sequestered as a pure gas is a means for producing an overlying vapor pressure greater than about 1 bar within said ionic concentrate that enables the carbon dioxide to be extracted from the flue gas and sequestered as a pure gas.

4. The system of claim 1, wherein said water wash having a degree of salinity so as to produce an ionic solution including ions is a water wash having an alkalinity pH greater than 6.0.

5. The system of claim 1, wherein said plurality of flow channels configured to fluidly communicate an oscillating flow between said feed flow channel and said concentrate flow channel comprises a plurality of flow channels configured to fluidly communicate an oscillating flow of greater than about 0.5 Hz between said feed flow channel and said concentrate flow channel.

\* \* \* \* \*